US011426967B2

(12) United States Patent
Kalish et al.

(10) Patent No.: US 11,426,967 B2
(45) Date of Patent: Aug. 30, 2022

(54) CUSHIONING STRUCTURES INCLUDING INTERCONNECTED CELLS

(71) Applicant: 3M INNOVATIVE PROPERTIES COMPANY, St. Paul, MN (US)

(72) Inventors: Jeffrey P. Kalish, St. Paul, MN (US); James M. Jonza, Lake Elmo, MN (US); David L. Vall, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 149 days.

(21) Appl. No.: 16/311,192

(22) PCT Filed: Jun. 23, 2017

(86) PCT No.: PCT/US2017/038926
§ 371 (c)(1),
(2) Date: Dec. 19, 2018

(87) PCT Pub. No.: WO2018/005272
PCT Pub. Date: Jan. 4, 2018

(65) Prior Publication Data

US 2019/0184672 A1 Jun. 20, 2019

Related U.S. Application Data

(60) Provisional application No. 62/356,681, filed on Jun. 30, 2016.

(51) Int. Cl.
*B32B 3/12* (2006.01)
*B32B 25/08* (2006.01)
(Continued)

(52) U.S. Cl.
CPC ............ *B32B 3/12* (2013.01); *A47G 27/0231* (2013.01); *B29C 48/002* (2019.02);
(Continued)

(58) Field of Classification Search
CPC ......... B32B 3/12; B32B 25/042; B32B 27/30; B32B 27/12; B32B 27/32; B32B 27/36;
(Continued)

(56) References Cited

U.S. PATENT DOCUMENTS 3,509,005 A * 4/1970 Hartig ....................... B32B 3/12 428/34.2
4,485,568 A 12/1984 Landi
(Continued)

FOREIGN PATENT DOCUMENTS

CN 102700144 A 10/2012
JP 06270305 A * 9/1994
(Continued)

OTHER PUBLICATIONS

International Search report for PCT International Application number dated Sep. 29, 2017, 3pages.

*Primary Examiner* — Jacob T Minskey
*Assistant Examiner* — S. Behrooz Ghorishi
(74) *Attorney, Agent, or Firm* — Yufeng Dong

(57) ABSTRACT

Cushioning articles or structures are provided including a cell layer with an array of cells interconnected with each other. Each of the cells includes at least three cell walls extending between the first and second major surfaces thereof. The cell walls are shared by the adjacent cells, and the cell layer further includes a land region located at the second major surface and connecting the at least three cell walls. A base layer is attached to the second major surface of the cell layer to form a sheet.

7 Claims, 3 Drawing Sheets

(51) Int. Cl.

| | |
|---|---|
| ***B32B 27/08*** | (2006.01) |
| ***A47G 27/02*** | (2006.01) |
| ***B32B 25/04*** | (2006.01) |
| ***B32B 27/30*** | (2006.01) |
| ***B32B 27/12*** | (2006.01) |
| ***B32B 27/32*** | (2006.01) |
| ***B32B 27/36*** | (2006.01) |
| ***B32B 27/40*** | (2006.01) |
| ***B32B 5/26*** | (2006.01) |
| ***B32B 7/12*** | (2006.01) |
| ***B32B 27/34*** | (2006.01) |
| ***B29C 48/88*** | (2019.01) |
| ***B29C 48/00*** | (2019.01) |
| ***B29C 59/02*** | (2006.01) |
| ***B29K 101/12*** | (2006.01) |
| ***B32B 37/15*** | (2006.01) |
| ***B32B 37/14*** | (2006.01) |
| ***B29K 105/00*** | (2006.01) |
| *B32B 37/00* | (2006.01) |
| *B32B 38/06* | (2006.01) |

(52) U.S. Cl.

CPC .............. *B29C 48/911* (2019.02); *B32B 5/26* (2013.01); *B32B 7/12* (2013.01); *B32B 25/042* (2013.01); *B32B 25/08* (2013.01); *B32B 27/08* (2013.01); *B32B 27/12* (2013.01); *B32B 27/30* (2013.01); *B32B 27/302* (2013.01); *B32B 27/304* (2013.01); *B32B 27/32* (2013.01); *B32B 27/34* (2013.01); *B32B 27/36* (2013.01); *B32B 27/40* (2013.01); *B29C 59/022* (2013.01); *B29K 2101/12* (2013.01); *B29K 2105/0067* (2013.01); *B32B 37/0053* (2013.01); *B32B 37/146* (2013.01); *B32B 37/153* (2013.01); *B32B 38/06* (2013.01); *B32B 2262/0207* (2013.01); *B32B 2262/0238* (2013.01); *B32B 2262/0253* (2013.01); *B32B 2262/0276* (2013.01); *B32B 2262/0292* (2013.01); *B32B 2270/00* (2013.01); *B32B 2305/024* (2013.01); *B32B 2307/51* (2013.01); *B32B 2307/54* (2013.01); *B32B 2307/554* (2013.01); *B32B 2307/72* (2013.01); *B32B 2307/732* (2013.01); *B32B 2471/04* (2013.01)

(58) Field of Classification Search

CPC ......... B32B 27/40; B32B 5/26; B32B 27/302; B32B 7/12; B32B 27/304; B32B 27/34; B32B 25/08; B32B 27/08; B32B 37/153; B32B 37/146; B32B 37/0053; B32B 38/06; B32B 2471/04; B32B 2262/0238; B32B 2307/732; B32B 2307/51; B32B 2262/0207; B32B 2307/54; B32B 2262/0276; B32B 2307/554; B32B 2307/72; B32B 2262/0253; B32B 2262/0292; B32B 2270/00; B32B 2305/024; B29C 48/002; B29C 48/911; B29C 59/022; A47G 27/0231; B29K 2101/12; B29K 2105/0067

See application file for complete search history.

(56) References Cited

U.S. PATENT DOCUMENTS

| | | | | | |
|---|---|---|---|---|---|
| 5,134,790 | A | | 8/1992 | Woitschaetzke et al. | |
| 5,203,607 | A | | 4/1993 | Landi | |
| 5,289,878 | A | | 3/1994 | Landi | |
| 5,496,610 | A | * | 3/1996 | Landi | B29C 53/04 428/73 |
| 6,117,519 | A | | 9/2000 | Burns | |
| 7,018,351 | B1 | | 3/2006 | Iglesias et al. | |
| 2006/0105135 | A1 | * | 5/2006 | Chien | B32B 3/12 428/73 |
| 2006/0280904 | A1 | | 12/2006 | Marson | |
| 2009/0226698 | A1 | | 9/2009 | De Maria | |
| 2012/0175206 | A1 | | 7/2012 | Kanous et al. | |
| 2014/0182170 | A1 | | 7/2014 | Wawrousek | |
| 2015/0165723 | A1 | | 6/2015 | Shuert | |

FOREIGN PATENT DOCUMENTS

| | | | | |
|---|---|---|---|---|
| JP | H6-270305 | A | | 9/1994 |
| JP | 09-510928 | | | 11/1997 |
| JP | 2001145968 | A | * | 5/2001 |
| JP | 2008302565 | A | * | 12/2008 |
| JP | 2010274527 | A2 | | 12/2010 |
| JP | 2008-302565 | | | 8/2012 |
| WO | WO 9519881 | A1 | | 7/1995 |

* cited by examiner

CUSHIONING STRUCTURES INCLUDING INTERCONNECTED CELLS

CROSS REFERENCE TO RELATED APPLICATIONS

This application is a national stage filing under 35 U.S.C. 371 of PCT/US2017/038926, filed Jun. 23, 2017, which claims the benefit of U.S. Application No. 62/356,681, filed Jun. 30, 2016, the disclosure of which is incorporated by reference in its/their entirety herein.

TECHNICAL FIELD

The present disclosure relates to cushioning articles or structures including interconnected cells, and methods of making and using the same.

BACKGROUND

Anti-fatigue or cushioning mats or pads have been around for years. The mats are typically used in industrial locations (e.g., factories, commercial stores), in the home (e.g., kitchen mats) and in recently in the office (e.g., sit/stand workstations). Cushioning mats or pads are typically foam (PVC or polyurethane) or molded rubber and are heavy (>4000 grams/$m^2$). U.S. Pat. No. 5,496,610 describes moldable panels for cushioning and protecting protrusions and areas.

SUMMARY

Briefly, in one aspect, the present disclosure describes an article including a cell layer having a first major surface and a second major surface opposite the first major surface. The cell layer includes an array of cells interconnected with each other. Each of the cells includes at least three cell walls extending between the first and second major surfaces thereof. The cell walls are shared by the adjacent cells. The cell layer further includes a land region located at the second major surface and connecting the at least three cell walls. A base layer is attached to the second major surface of the cell layer to form a sheet.

In another aspect, the present disclosure describes a method including extruding a molten material through an extrusion die to form a molten extrudate having first and second major surfaces, and bringing the molten extrudate into contact with a tool surface. The tool surface includes a pattern to be transferred into the first major surface of the molten extrudate. The method further includes cooling the molten extrudate to provide a cell layer, and providing a base layer to be attached to the second major surface of the molten extrudate before cooling the molten extrudate. The cell layer includes an array of cells interconnected with each other. Each of the cells includes at least three cell walls extending between the first and second major surfaces thereof. The cell walls each are shared by the adjacent cells, and the cell layer further includes a land region located at the second major surface and connecting the cell walls.

Various unexpected results and advantages are obtained in exemplary embodiments of the disclosure. One such advantage of exemplary embodiments of the present disclosure is that the articles exhibit various beneficial properties including, for example, light weight, soft with a low modulus, high coefficient of friction, conformable, resilient, good elastic recovery, low cost, etc. The articles can provide various cushioning applications in, for example, matting, fall protection, surface protection, vibration dampening, medical protection, etc.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
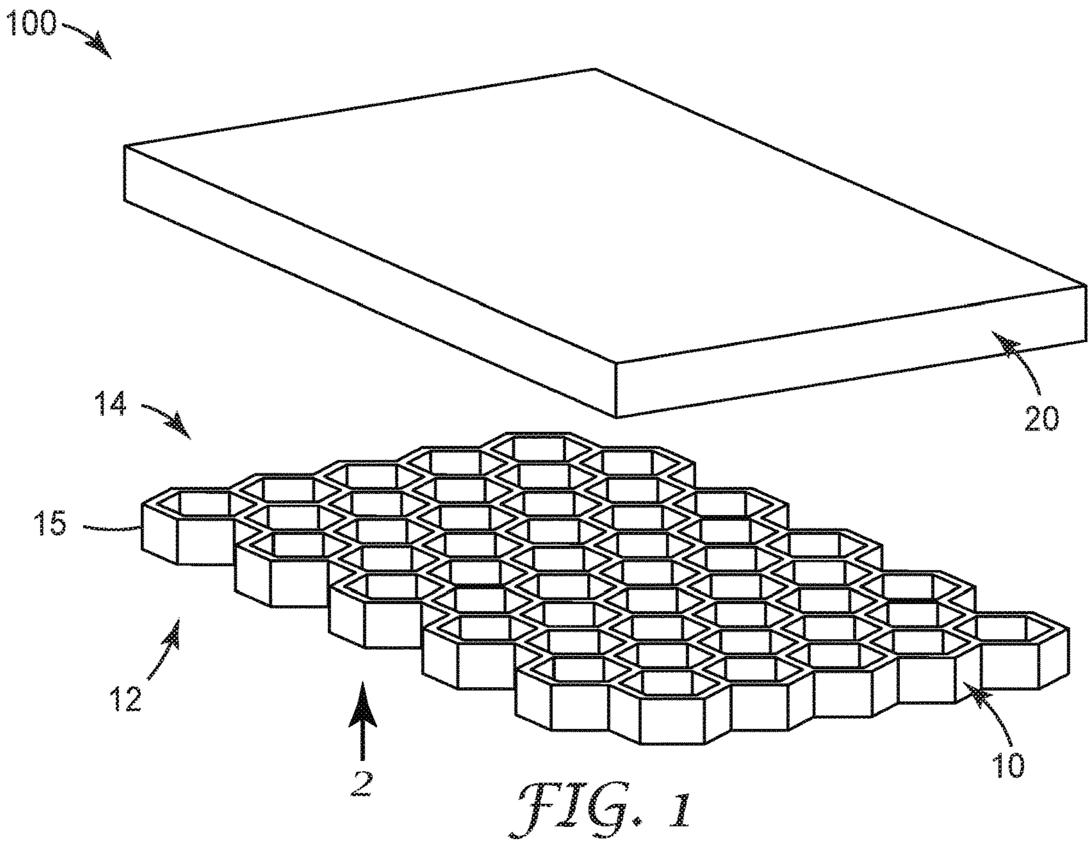
FIG. 1 is a side perspective view in exploded form of an article including a cell layer and a base layer, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

The term "extrusion replication" refers to a process in which material is melted in an extruder, shaped into a molten mass (e.g., a sheet) in a die, then cast or pressed between two surfaces to form a film.

By "structured surface" it is meant that a surface of an article, including a surface of an extruded material ("extrudate") as well as a surface of a tool, deviates from a substantially planar or other smooth surface. When describing a tool, a structured surface may include features such as posts, grooves, ridges, geometric shapes, other structures, or the like. When used in describing an extruded material, a structured surface may be indicated by the presence of interconnected cell walls, or any modulations to the cell walls.

The term "molten" is used herein to describe material that is at a temperature above its softening point and having a viscosity low enough to flow under pressure.

By using terms of orientation such as "atop", "on", "over", "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means +/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds.

As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Various exemplary embodiments of the disclosure will now be described with particular reference to the Drawings.

Figure 2:
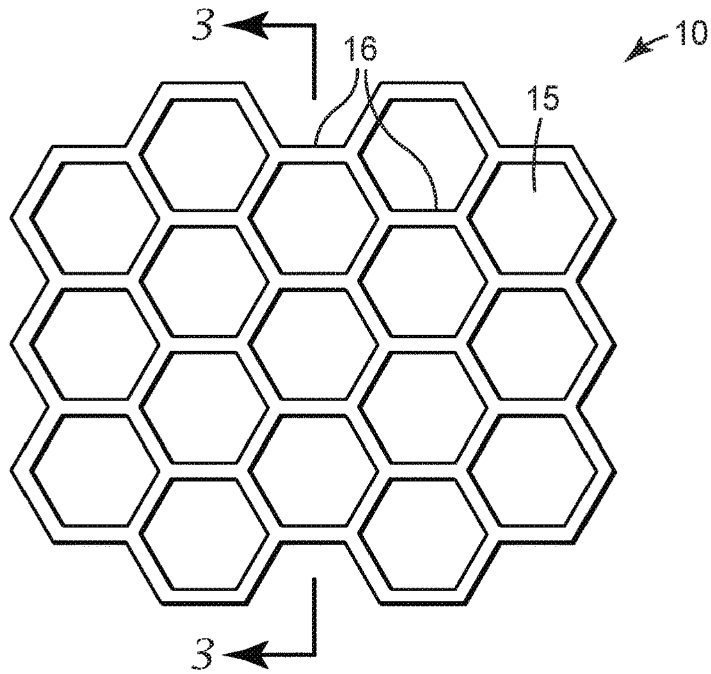
FIG. 2 is a simplified top view of the article of FIG. 1.
Figure 3:
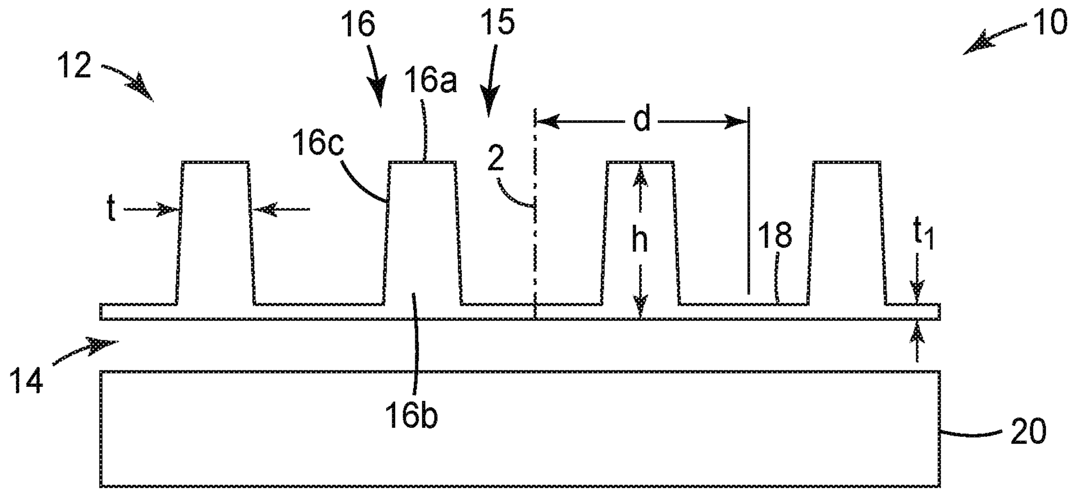
FIG. 3 is a cross-sectional view of the article of FIG. 1 along the cross line 3-3 in FIG. 2.

FIG. 1 is a side perspective view in exploded form of an article 100 including a cell layer 10 and a base layer 20, according to one embodiment. The cell layer 10 has a first major surface 12 and a second major surface 14 opposite the first major surface 12. The cell layer 10 includes an array of cells 15 interconnected with each other. As also shown in FIGS. 2-3, the cells 15 include cell walls 16 each extending between first and second ends 16*a* and 16*b* thereof at the respective first and second major surfaces 12 and 14. The cell walls 16 each are shared by the adjacent cells 15 except for the cell walls at very edges of the cell layer 10. In the embodiment shown in FIGS. 1-3, the cells 15 each include six shared walls 16 that form a honeycomb pattern. In the present disclosure, the cells 15 can include at least three cell walls. It is to be understood that in some embodiments, at least some of the cells may include other numbers of shared walls including, for example, three, four, five, seven, or eight shared walls to form any desired patterns.

As shown in FIG. 3, the cell layer 10 further includes a land region 18 located at the second major surface 14, extending along the second major surface 14, and connecting the cell walls 16 at the second major surface 14. The land region 18 is not shown in FIG. 1 for clarity. In the depicted embodiment, the land region 18 is not a separate film that attaches to the cell walls 16 at the second major surface 14. Instead, the cell walls 16 and the land region 18 can have substantially the same composition and are continuously connected at the second ends 16*b*.

In some embodiments, the land region 18 and the adjacent cell walls 16 form a continuous structure. That is, the land region 18 and the ends 16*b* of the cell walls are continuously connected in terms of structure and composition, in the absence of a noticeable internal interface region (e.g., no bonding interface regions).

The cell walls have a height "h" measured between the first and second major surfaces 12 and 14. In some embodiments, the height "h" can be, for example, about 0.05 cm or more, about 0.1 cm or more, or about 0.2 cm or more. The height "h" can be, for example, about 5 cm or less, about 3 cm or less, or about 1 cm or less. The height "h" can be in a range of, for example, about 0.1 cm to about 3.0 cm. The cells 15 has a center-to-center distance "d". In some embodiments, the center-to-center distance "d" can be, for example, about 0.002 cm or more, about 0.005 cm or more, or about 0.01 cm or more. The center-to-center distance "d" can be, for example, about 1 cm or less, about 0.5 cm or less, about 0.3 cm or less, or about 0.1 cm or less. The center-to-center distance "d" can be in a range of, for example, about 0.005 cm to about 0.3 cm. The land region 18 has a thickness "ti" which can be, for example, about 0.002 cm or more, about 0.005 cm or more, or about 0.01 cm or more. The thickness "ti" which can be, for example, about 1 cm or less, about 0.5 cm or less, about 0.3 cm or less, or about 0.1 cm or less. The thickness "ti" can be in a range of, for example, about 0.005 cm to about 0.3 cm. The cell walls 16 has a thickness "t" which can be, for example, about 0.005 cm or more, about 0.01 cm or more, or about 0.02 cm or more. The thickness "t" can be, for example, about 2.0 cm or less, about 1.0 cm or less, or about 0.5 cm or less. The thickness "t" can be in a range of, for example, 0.01 cm to about 1.0 cm.

In some embodiments, the cell walls 16 each may have a tapered shape. The thickness "t" of the cell walls 16 decreases from the second major surface 14 to the first major surface 12. A draft angle is formed between side surfaces 16*c* of the cell walls 16 and a vertical direction 2. In some embodiments, the draft angle can be, for example, about 10° or less, about 5° or less, or about 3° or less. The draft angle can be, for example, about 0.05° or more, about 0.1° or more, or about 0.5° or more. In some embodiments, the draft angle can be in a range of, for example, about 0.1° to about 10°. In some embodiments, the draft angle can be between 0.5° to 3°. In some embodiments, the adjacent cell walls 16 may have substantially the same thickness or thickness profile.

Figure 4:
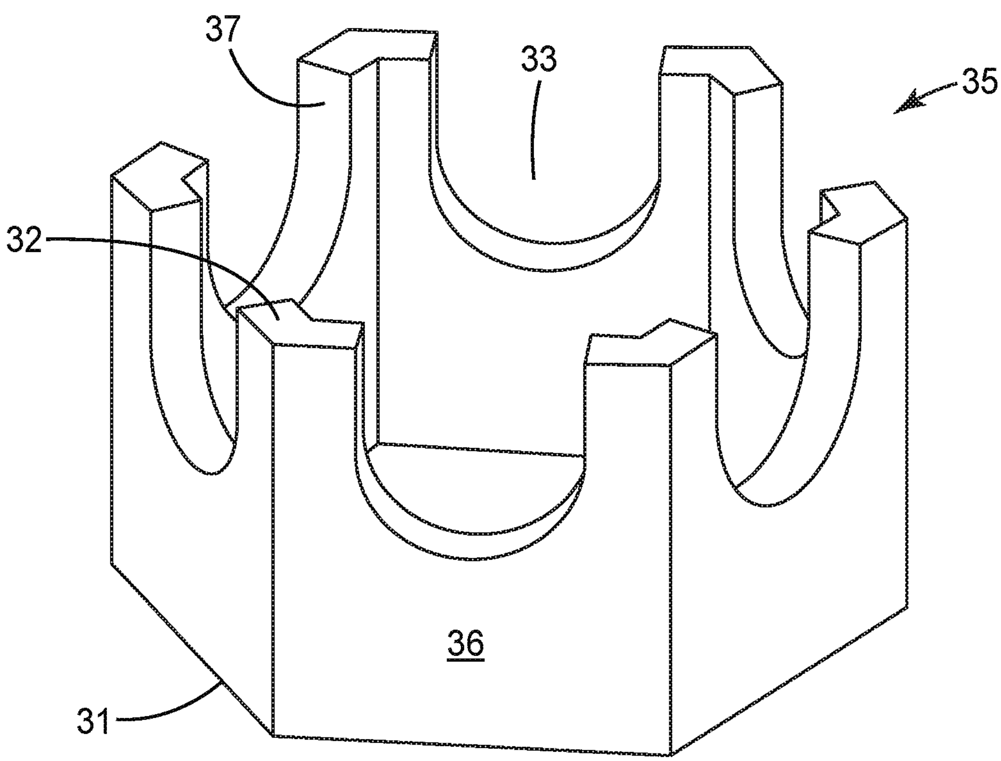
FIG. 4 is a perspective view of a single cell having a modulated end, according to one embodiment.

In some embodiments, at least some of the cell walls each may include a modulated end adjacent the first major surface 12 of the cell layer 10. FIG. 4 is a perspective view of a single cell 35 having a modulated end 32, according to one embodiment. An array of cells 35 can be interconnected in a manner as shown in FIGS. 1-3 to form a cell layer such as the cell layer 10. In each of the cells 35, the modulated end 32 includes vertices 37 at joints of the adjacent cell walls 36. The vertices 37 each can widen towards the end 31 thereof. The ends 31 can be connected by a land region such as the land region 18 of FIG. 3. In some embodiments, the vertices 32 can be free-standing without another layer attached thereon.

Openings 33 are formed on at least some of the cell walls 36. In the depicted embodiment, the opening 33 has a "U" or arch shape. It is to be understood that the opening 33 can have various shapes to form vertices such as the vertices 32. In some embodiments, the percent area of the opening 33 in the cell wall 36 can be, for example, about 10% or more, about 20% or more, about 30% or more, about 40% or more, or about 50% or more. The percent area may be, for example, about 95% or less, about 90% or less, about 85% or less, or about 80% or less. The percent area may be, for example, about 5% to about 95%, about 10% to about 90%, or about 20% to about 80%.

The cell layer 10 including interconnected cells 15 or 35 can be made of one or more thermoplastic elastomers (TPEs). Suitable TPEs may include, for example, one or more of ethylene based polymers (e.g., ethylene vinyl acetate (EVA) copolymer commercially available from DuPont, Wilmington, Del., under the tradename "Elvax"), polyolefin copolymers (e.g., polyolefin elastomers commercially available from Dow Chemical Company, Midland, Mich., under the tradename "Engage", ethylene alpha olefin copolymers commercially available from ExxonMobil under the tradename "Exact", olefin block copolymers commercially available from Dow Company, Midland, Mich., under the tradename "Infuse"), block copolymers (e.g., styrene-isoprene-styrene (SIS), and styrene-ethylene/butylene-styrene (SEBS) commercially available from Kraton Polymers under the tradename "Kraton"), polyester copolymers (e.g., hybrid thermoplastic elastomers commercially available from DuPont, Wilmington, Del., under the tradename "Hytrel"), polyurethanes (e.g., various polyurethane materials commercially available from Lubrizol, Wickliffe, Ohio, under the trade name "Estane"), etc.

As shown in FIG. 3, the cell layer 10 has its second major surface 14 attached to a base layer 20 to form a sheet. The base layer 20 can be any suitable film onto which the cell layer 10 can be attached. The base layer 20 can be a single layer or a multi-layer structure. It is to be understood that in some embodiments, the base layer 20 and the land region 18 may be formed as a one-piece structure where the base layer

20 is not a separate layer attached to the cell layer and there is no noticeable internal interface between the base layer and the land region.

In some embodiments, the base layer 20 may be attached to the cell layer 10 by using, for example, adhesives. In some embodiments, the base layer 20 may have a surface capable of attaching, bonding, or adhering to the cell layer 10. For example, in an extrusion process to be discussed further below, the base layer 20 can have a surface layer that is able to bond to an extrudate material with heat and/or pressure. This type of adhesion may occur when two similar materials are held together with heat and/or pressure. In one exemplary extrusion process, an ethylene based copolymer can be extruded and laminated to a film having a surface also substantially comprised of polyethylene. Another example is an ethylene copolymer being extruded onto a two layer PET-EVA film. The ethylene copolymer can bond better to the EVA side of the two layer film than to the PET side of the film. It is to be understood that in some embodiments, only the surface of base layer 20 needs to be heat bondable to, for example, an extrudate in an extrusion process.

In some embodiments, the base layer 20 can be, for example, a sheet, a film, a nonwoven, a fabric, a foil, or combinations or laminates thereof such as, for example, a metallized film.

Suitable base layers can include, for example, polymer films, nonwovens, or fabrics containing polyethylene, rubber, polypropylene, polyvinyl chloride, polyester, polyurethane, polyamide, or copolymers thereof. One exemplary film is commercially available from Packsource Systems, Inc., Simi Valley, Calif. under the tradename "Surlyn". In some embodiments, the base layer 20 can be a polymeric film including, for example, polyethylene terephthalate (PET), which can be primed or treated to adhere to other functional films such as, for example, graphic films for customization, traction films for slip protection, etc. The base layer 20 can include one or more suitable materials for various application including, for example, abrasion resistance, graphic or logo for personalization, advertisings or branding, slip protection with a rough surface, etc.

Sheets including one or more cell layers and base layers, e.g., the cell layer 10 and the base layer 20, can be applied as a cushioning mat or pad. In some embodiments, the sheet can have a thickness of, for example, about 0.05" (about 0.1 cm) or more, or about 0.1" (about 0.25 cm) or more. The sheet thickness can be, for example, about 1" (about 2.5 cm) or less, or about 0.5" (about 1.3 cm) or less. The sheet thickness can be in a range of, for example, about 0.125" (about 0.3 cm) to about 0.35" (about 0.9 cm). In some embodiments, the sheet may have a density of, for example, about 0.02 g/cc or more, about 0.05 g/cc or more, about 1 g/cc or less, about 0.5 g/cc or less, or about 0.1 g/cc to about 0.3 g/cc. In some embodiments, the sheet may have a compression modulus of, for example, about 20 psi or more, about 40 psi or more, about 200 psi or less, about 150 psi or less, or about 60 psi to about 130 psi. In some embodiments, the sheet may have a compression yield stress of, for example, about 1 psi or more, about 2 psi or more, about 20 psi or less, about 15 psi or less, or about 3 psi to about 12 psi. In some embodiments, the sheet may have less than about 60%, less than about 50%, or less than 40% compression set. Compression set is the amount of permanent deformation left in a material after an applied force is removed. ASTM D395 describes procedures to measure the amount of compression set in a material.

Figure 5:
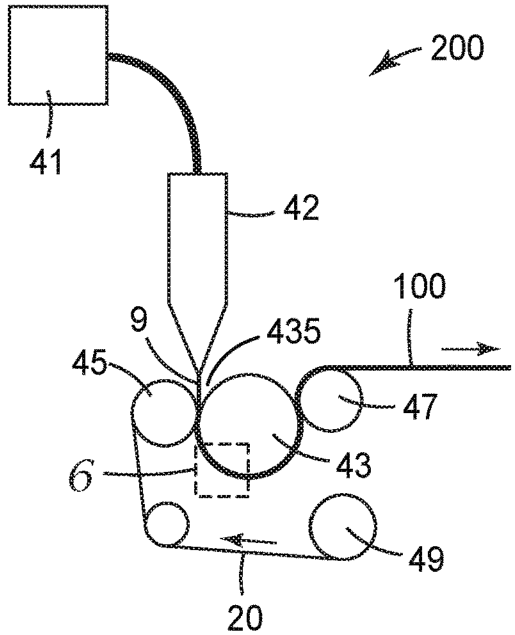
FIG. 5 is a schematic view of an extrusion replication process for making the article of FIG. 1, according to one embodiment.
Figure 6:
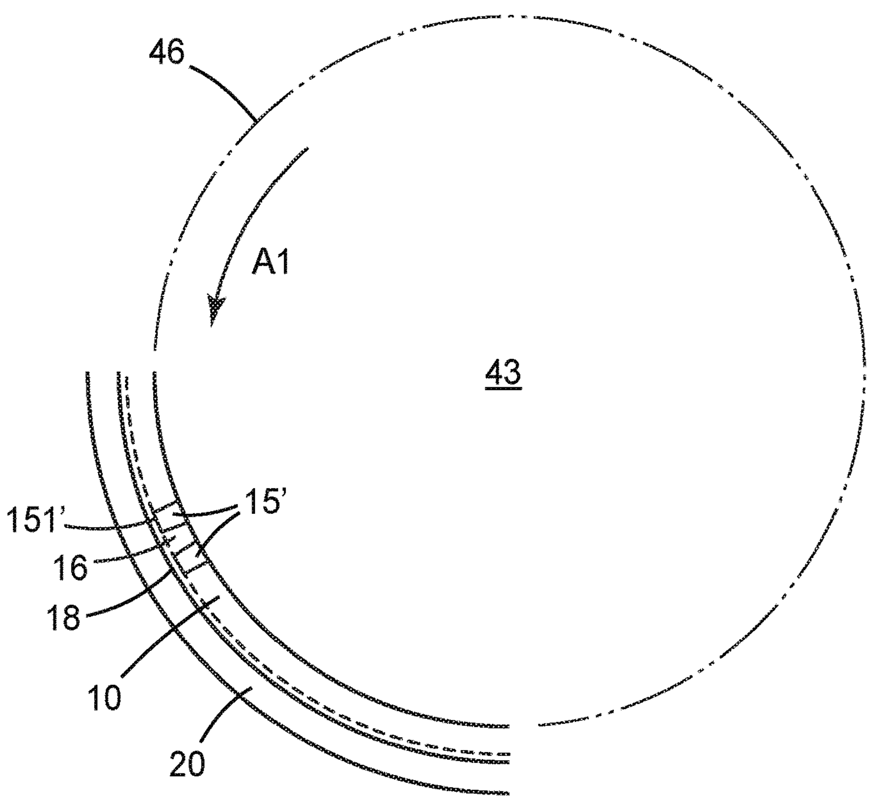
FIG. 6 is an enlarged portion view of FIG. 5.

Cushioning structures or articles described herein such as, for example, the article 100 of FIG. 1, can be made by any suitable processes including, for example, an injection molding process, a compression molding process, a 3D printing process, an extrusion replication process, etc. An exemplary extrusion replication process is illustrated in FIGS. 5 and 6. An apparatus 200 includes an extruder 41 and a die 42 through which an extrusion material can be extruded as a molten extrudate 9. From the die 42, the molten extrudate 9 can be cast into a 3-roll horizontal casting station including a tool roll 43, a first roll 45 and a second roll 47 disposed on opposite sides of the tool roll 43. The first roll 45 and the tool roll 43 can rotate at opposite directions (e.g., a direction A1 for the tool roll 43 in FIG. 6) to form a nip 435 therebetween. A film 20 is supplied from a film unwind 49 into the nip 435 as a base layer. At the same time, the molten extrudate 9 advances into the nip 435 where the rotation of the rolls 43 and 45 force a portion of the molten extrudate 9 into contact with one or more structural features (e.g., posts 15' in FIG. 6) on the outer surface 46 of the tool roll 43 on one side, and into contact with the base layer 20 on the other side. The heat of the molten extrudate 9 can cause self-adhesion of the base layer 20 to the extrudate 9. As the extrudate 9 advances beyond the nip 435, the extrudate 9 begins to solidify by cooling on the outer surface 46 of the tool roll 43 to form the cell layer 10. As shown in the enlarged portion view of FIG. 6, the posts 15' insert into the extrudate to form the corresponding cells including the cell walls 16 in the cell layer 10. In the depicted embodiment, distal ends 151' of the posts 15' are not in direct contact with the base layer 20. The portion of molten extrudate residing between the distal ends 151' and the base layer 20 can adhere to the base layer 20 and solidify to form the land region 18. In this manner, the cell walls 16 and the land region 18 can form a continuous structure.

The outer surface 46 of the tool roll 43 includes a pattern to be replicated into the molten extrudate. When the extrudate cools on the outer surface 46 of the tool roll 43, the extrudate solidifies to form the cell layer 10, and can be removed from the tool roll 43. The solidified extrudate is now a continuous web having a first major surface with a pattern complementary to the structural features on the outer surface 46 of the tool roll 43, and a second major surface to which the base layer 20 adheres. The second roll 47 can help to further cool the extrudate and remove the formed cell layer 10 from the tool roll 43. The article 100 may be further processed in a manner known by those of ordinary skill in the art.

In some embodiments, one or more of the first roll 45, the tool roll 43, and the second roll 47 can include a temperature control mechanism such as, for example, a water temperature control, an oil heat transfer fluid for temperature control, etc. The temperature control mechanism can be utilized to control the cooling and solidification of the molten extrudate in the extrusion and replication process.

In some embodiment, the first roll 45 can be made of metal, e.g., steel such as stainless steel, or aluminum, or any other appropriate material. The first roll 45 can have a diameter of, for example, from about 10 cm or less to about 50 cm or more. The first roll 45 may have a smooth surface formed with, e.g., chromium, copper, nickel, nickel-phosphorous plating, or any other serviceable plating, or in some embodiments, the first roll 45 may have a conformable surface layer (e.g., silicone, rubber, or EPDM). The outer surface on first roll 45 can have a mirror finish, or can have a structured surface. The first roll 45 is typically cooled with water or other heat transfer fluid.

In some embodiment, the tool roll 43 can be made of metal, e.g. steel such as stainless steel, or aluminum, or any other appropriate material. The tool roll 43 can have a diameter of for example, from about 20 cm or less to about 80 cm or more. The tool roll 43 may have a plated surface formed with, e.g., chromium, copper, nickel, nickel-phosphorous plating, or any other serviceable plating. In the various embodiments described herein, the tool roll 43 typically is provided with a structured surface. The tool roll 43 can transfer its structured surface profile to the cell layer 10 so that the cell layer 10 possesses a surface profile complementary to that of the tool roll 43. The tool roll 43 may have an outer layer, such as a metal sleeve or laminated coating that contains the structural features to be replicated. The tool roll 43 is typically connected to a temperature control unit containing heat transfer fluid where the heat transfer fluid can be circulated to and from the roll to maintain a set temperature.

In the depicted embodiment of FIG. 5, the apparatus 200 including a 3-roll horizontal casting station is used for an extrusion replication process. It is to be understood that in some embodiments, any suitable apparatus including a tool roll having a patterned tool surface can be applied for the extrusion replication process. The extrusion replication processes described herein can be a continuous process, e.g., a roll-to-roll process, in which the finished product (e.g., the article 100) can be rolled up on a roll.

In an extrusion replication process described herein, a molten material can be extruded through an extrusion die to form a molten extrudate having first and second major surfaces. The molten extrudate can be brought into contact with a tool surface that includes a pattern to be replicated in the first major surface of the molten extrudate. The molten extrudate can be cooled or solidified to provide a cell layer. The cell layer can include an array of cells interconnected with each other. Each of the cells can include at least three cell walls extending between the first and second major surfaces thereof. The cell walls can be shared by the adjacent cells, and the cell layer can further include a land region located at the second major surface and connecting the cell walls.

In some embodiments, a base layer can be provided to attach to the second major surface of the molten extrudate before cooling the molten extrudate. In some embodiments, the molten material can be extruded vertically downward and into a space between the base layer and the tool surface. In some embodiments, bringing the molten extrudate into contact with a tool surface can further include nipping, via a nip roll and a tool roll, the molten extrudate between the tool surface and the base layer, and the tool surface is a surface of the tool roll. In some embodiments, a surface of the base layer can be treated to improve self-adhesion of the base layer to the extrudate. In some embodiments, one or more films can be adhered to the base layer on the side opposite the cell layer to fulfill any desired functions.

Cushioning articles or structures such as cushioning sheets including interconnected cells are provided herein. Some cells are connected by land regions at one end, and have cell walls modulated at the opposite end. The articles can exhibit various beneficial properties including, for example, light weight, soft with a low modulus, high coefficient of friction, conformable, resilient, good elastic recovery, low cost, etc. The articles can provide various cushioning applications in, for example, matting, fall protection, surface protection, vibration dampening, etc. The articles can also be applied for medical protection, such as, for example, as a part of a bed sore prevention pad.

LISTING OF EXEMPLARY EMBODIMENTS

It is to be understood that any one of embodiments 1-18 and 19-24 can be combined.

Embodiment 1 is an article comprising:

a cell layer having a first major surface and a second major surface opposite the first major surface, the cell layer comprising an array of cells interconnected with each other, each of the cells comprising at least three cell walls extending between the first and second major surfaces thereof, the cell walls each being shared by the adjacent cells, the cell layer further comprising a land region located at the second major surface and connecting the cell walls; and a base layer attached to the second major surface of the cell layer to form a sheet.

Embodiment 2 is the article of embodiment 1, wherein the land region extends along the second major surface and forms a continuous structure with the cell walls at the second major surface, and the land region is attached to the base layer.

Embodiment 3 is the article of embodiment 1 or 2, wherein the base layer comprises one or more layers of polystyrene based block copolymer, polyethylene, rubber, polypropylene, polyvinyl chloride, polyester, polyurethane, polyamide, or copolymers thereof.

Embodiment 4 is the article of any one of embodiments 1-3, wherein the continuous structure formed by the land region and the cell walls at the second major surface has no internal interface.

Embodiment 5 is the article of any one of embodiments 1-4, wherein the cell layer comprises one or more thermoplastic elastomers (TPEs).

Embodiment 6 is the article of any one of embodiments 1-5, wherein at least some of the cell walls each include a modulated end adjacent the first major surface of the cell layer.

Embodiment 7 is the article of embodiment 6, wherein the modulated ends include a plurality of vertices at joints of the adjacent cell walls, the vertices widening towards the second major surface of the cell layer.

Embodiment 8 is the article of embodiment 6 or 7, wherein the modulated end includes an opening on the respective cell wall, wherein the modulated end includes an opening on the respective cell wall, the percent area of the opening and the cell wall being about 10 to about 90 percent.

Embodiment 9 is the article of any one of embodiments 1-8, wherein the cell walls each have a thickness tapered away from the second major surface.

Embodiment 10 is the article of embodiment 9, wherein the cell walls have a draft angle of about 0.1° to about 10°.

Embodiment 11 is the article of any one of embodiments 1-10, wherein the cells each comprise six shared walls to form a honeycomb pattern.

Embodiment 12 is the article of any one of embodiments 1-11, wherein the cell walls have substantially the same thickness.

Embodiment 13 is the article of any one of embodiments 1-12, wherein the sheet has a thickness of about 0.125" to about 0.35".

Embodiment 14 is the article of any one of embodiments 1-13, wherein the sheet has a density of about 0.1 g/cc to about 0.3 g/cc.

Embodiment 15 is the article of any one of embodiments 1-14, wherein the sheet has a compression modulus of about 50 psi to about 150 psi.

Embodiment 16 is the article of any one of embodiments 1-15, wherein the sheet has a compression yield stress of about 3 psi to about 25 psi.

Embodiment 17 is the article of any one of embodiments 1-16, wherein the sheet has less than about 50% compression set.

Embodiment 18 is the article of any one of embodiments 1-17, wherein the sheet is a cushioning pad or mat.

Embodiment 19 is a method comprising:

extruding a molten material through an extrusion die to form a molten extrudate having first and second major surfaces;

bringing the molten extrudate into contact with a tool surface, the tool surface comprising a pattern to be replicated in the first major surface of the molten extrudate; and cooling the molten extrudate to provide a cell layer; and providing a base layer to be attached to the second major surface of the molten extrudate before cooling the molten extrudate, wherein the cell layer comprises an array of cells interconnected with each other, each of the cells comprising at least three cell walls extending between the first and second major surfaces thereof, the cell walls each being shared by the adjacent cells, and the cell layer further comprises a land region located at the second major surface and connecting the cell walls.

Embodiment 20 is the method of embodiment 19, wherein the land region extends along the second major surface and forms a continuous structure with the cell walls at the second major surface, and the land region is attached to the base layer further comprising.

Embodiment 21 is the method of embodiment 19 or 20, wherein extruding the molten material comprises extruding the molten material vertically downward and into a space between the base layer and the tool surface.

Embodiment 22 is the method of any one of embodiments 19-21, wherein bringing the molten extrudate into contact with a tool surface comprises nipping, via a nip roll and a tool roll, the molten extrudate between the tool surface and the base layer, and the tool surface is a surface of the tool roll.

Embodiment 23 is the method of any one of embodiments 19-22, wherein providing the base layer further comprises treating a surface of the base layer, and adhering one or more films to the base layer on the side opposite the cell layer.

Embodiment 24 is the method of any one of embodiments 19-23, wherein extruding the molten material comprises extruding one or more thermoplastic elastomers (TPEs).

Embodiment 25 is the method of any one of embodiments 19-24, wherein the base layer and the cell layer are attached to form an article, and the article is rolled up in a roll-to-roll process.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Extrusion Replication Process

Examples 1-3 below were made by an extrusion replication process such as shown in FIGS. 5 and 6. Polymer pellets were fed into a feed throat of a singe screw extruder (2.5" NRM extruder from Davis-Standard, Pawcatuck, Conn.). The extruder was connected to a film die (18" wide EDI film die from Nordson Extrusion Dies Industries, Chippewa Falls, Wis., equipped with a shim to set die lip gap to 150 mil or 0.150 inch) with heated steel tubing. The extrudate was cast into a 3-roll horizontal casting station. All three rolls were 40" wide. The first roll was 10" diameter, smooth steel, and contained water for temperature control. The second roll was a patterned roll which was 20" diameter, had a repeating hexagonal pattern machined 0.3" deep, and used oil heat transfer fluid for temperature control. The third roll was a 10" diameter rubber coated roll with water temperature control. At the same time that the extrudate passed between the smooth roll and patterned roll it came into contact with a film supplied from a film unwind. The heat of the extrudate caused self-adhesion of the film unwind to the molten extrudate. Once the extrudate cooled in the patterned roll, the extrudate solidified into the hexagonal shape and was removed from the patterned roll. A third rubber roll was used to help to cool the extrudate and remove it from the patterned roll. A Conair Dual Belt Puller (36" wide belts, equipped with Hypalon® belts, from Conair North America, Cranberry Township, Pa.) also was used to help remove the solidified material from the patterned roll. This process was a continuous process, i.e. a roll-to-roll process, in which the finished product was wound up on a roll.

Example 1

Surlyn® film was purchased from Packsource Systems, Inc. (Simi Valley, Calif.). This grade of Surlyn® film was 15 mil (0.0015") thick and 20" wide. This film was mounted on to a film unwind and unwound into the nip between the smooth roll and the patterned roll. A blend of Infuse 9807 (available from Dow Chemical Company, Midland, Mich.) and NA2170000 low density polyethylene (available from LyondellBasell Industries, Houston, Tex.) was fed at a ratio of 80% Infuse 9807 and 20% NA2170000 into the 2.5" single screw extruder. A hexagonal patterned tooling roll was used where each individual hexagon measures 11 mm side to side. This process produced a regular array of soft hexagons 11 mm wide (side to side distance) and 0.28" tall with good adhesion to the Surlyn® film. This example had a 0.003" thick land region.

Example 2

Surlyn® film was purchased from Packsource Systems, Inc. (Simi Valley, Calif.). This grade of Surlyn® film was 15 mil (0.0015") thick and 20" wide. This film was mounted on to a film unwind and unwound into the nip between the smooth roll and the patterned roll. A blend of Infuse 9807 (available from Dow Chemical Company, Midland, Mich.) and NA2170000 low density polyethylene (available from LyondellBasell Houston, Tex.) was fed at a ratio of 90% Infuse 9807 and 10% NA2170000 into the 2.5" single screw extruder. A hexagonal patterned tooling roll was used where each individual hexagon measures 11 mm side to side. This process produced a regular array of soft hexagons 11 mm wide (side to side distance) and 0.28" tall with good adhesion to the Surlyn® film. This example had a 0.003" land layer.

Example 3

Surlyn® film was purchased from Packsource Systems, Inc. (Simi Valley, Calif.). This grade of Surlyn® film was 15 mil (0.0015") thick and 20" wide. This film was mounted on to a film unwind and unwound into the nip between the smooth roll and the patterned roll (FIG. 5). A blend of Infuse 9807 (available from Dow Chemical Company, Midland, Mich.) and Engage XLT 8677 (available from Dow Chemical Company, Midland, Mich.) was fed at a ratio of 60% Engage XLT 8677 and 40% Infuse 9807 into the 2.5" single screw extruder. Example 3 used a hexagonal patterned tooling roll where each individual hexagon measured 8 mm side to side. This example produced a soft array of hexagons 8 mm wide (side to side distance) and 0.27" tall. The land region (cap layer) thickness for this example was 0.010".

Example 4

A regular hexagonal array was 3D printed from a CAD file. These specimens were produced on an Objet/Stratasys PolyJet 3D printer (from Stratasys, Eden Prairie, Minn.) using the TangoBlack FLX973 rubberlike material (from Stratasys, Eden Prairie, Minn.).

This specimen had a 0.5 mm base layer, 7 mm tall interconnected hexagons measuring 11 mm side to side. Example 4 had full hexagonal cell walls. Examples 5-7 were made by modulating an end (opposite the base layer) of the cell walls into a configuration such as shown in FIG. 4. In Examples 4-7, the base layer and land region were formed as a one-piece structure by 3D printing.

Example 5

A regular hexagonal array was 3D printed from a CAD file. These samples were produced on an Objet/Stratsys PolyJet 3D printer using the TangoBlack FLX973. This sample had a 0.5 mm base layer, 7 mm tall interconnected hexagons measuring 11 mm side to side. Example 5 had a 2 mm radius cut out of the top of the hexagon cell walls.

Example 6

A regular hexagonal array was 3D printed from a CAD file. These samples were produced on an Objet/Stratsys PolyJet 3D printer using the TangoBlack FLX973. This sample had a 0.5 mm base layer, 7 mm tall interconnected hexagons measuring 11 mm side to side. Example 6 had a 2 mm deep, 2 mm radius cut out of the top of the hexagon cell walls.

Example 7

A regular hexagonal array was 3D printed from a CAD file. These samples were produced on an Objet/Stratsys PolyJet 3D printer using the TangoBlack FLX973. This sample had a 0.5 mm base layer, 7 mm tall interconnected hexagons measuring 11 mm side to side. Example 7 had a 4 mm deep, 2 mm radius cut out of the top of the hexagon cell walls.

TABLE 1

| Examples | Elastic Modulus (psi) | Yield Stress (psi) |
|---|---|---|
| Example 1 | 210 | 32 |
| Example 2 | 132 | 22 |
| Example 3 | 165 | 22 |
| Example 4 | 187 | 18 |
| Example 5 | 87 | 12 |
| Example 6 | 61 | 11 |
| Example 7 | 69 | 10 |

Elastic modulus and yield stress were measured for the above examples and the results are listed below in Table 1. An Instron Model 5500R (from Instron, Norwood, Mass.) was setup with flat plates to run a standard compression test at 0.5 in/min with a 10 kN load cell. Elastic modulus is defined as the slope of the stress-strain curve in the initial elastic region. The 0.2% offset yield stress was used as a yield stress in Table 1. This was calculated by offsetting a line 0.2% on the x-axis that has the same slope as the modulus.

Example 1 compared to Example 2 shows the effect of material composition. Example 1 had 80% TPE (Infuse 9807) and 20% LDPE (NA217000) whereas Example 2 had 90% TPE and 10% LDPE. Example 2 showed that with less LDPE the elastic modulus decreased and yield stress decreased for the same geometrical pattern.

Example 2 compared to Example 3 shows the effect of the geometric pattern. Example 2 had larger hexagons (11 mm) and Example 3 had smaller hexagons (8 mm). The smaller hexagons in Example 3 produced a higher elastic modulus.

Example 4 is an 11 mm wide hexagonal structure with similar dimensions as Examples 1 and 2 which were made by an extrusion replication process, while Example 4 was made using 3D printing. When Example 4 is compared to Examples 5, 6, and 7 it can be seen that the greater percent area removed from the cell wall produced a lower elastic modulus and lower yield stress. Examples 5-7 were made by modulating an end (opposite the base layer) and showed significant decrease of both modulus and yield stress. This feature is advantageous when producing a cushioning or impact absorbing structure.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method comprising:

extruding a molten material through an extrusion die to form a molten extrudate having first and second major surfaces;

bringing the molten extrudate into contact with a rotating tool surface, the rotating tool surface comprising a pattern to be replicated in the first major surface of the molten extrudate, the pattern comprising an array of posts;

inserting the array of posts into the molten extrudate from the first major surface thereof, consisting of squeezing the molten extrude between a base layer and the rotating tool surface such that the array of posts only partially inserts into the molten extrudate along a thickness direction thereof to form an array of cells; and cooling the molten extrudate to provide a cell layer, wherein the base layer is attached to the second major surface of the molten extrudate before cooling the molten extrudate, and wherein the cell layer comprises the array of cells interconnected with each other, each of the cells comprising at least three cell walls extending between the first and second major surfaces thereof, the cell walls each being shared by the adjacent cells, and the cell layer further comprises a land region located at the second major surface and connecting the cell walls.

2. The method of claim 1, wherein the land region extends along the second major surface and forms a continuous structure with the cell walls at the second major surface, and the land region is attached to the base layer.

3. The method of claim 1, wherein extruding the molten material comprises extruding the molten material vertically downward and into a space between the base layer and the tool surface.

4. The method of claim 1, wherein bringing the molten extrudate into contact with the tool surface comprises nipping, via a nip roll and a tool roll, the molten extrudate between the tool surface and the base layer, and the tool surface is a surface of the tool roll.

5. The method of claim 1, wherein providing the base layer further comprises treating a surface of the base layer, and adhering one or more films to the base layer on the side opposite the cell layer.

6. The method of claim 1, wherein extruding the molten material comprises extruding one or more thermoplastic elastomers (TPEs).

7. The method of claim 1, further comprising rolling up the base layer and the cell layer that are attached to each other.

* * * * *